United States Patent
Demorais et al.

(10) Patent No.: US 10,436,269 B2
(45) Date of Patent: Oct. 8, 2019

(54) ACTIVE RETRACTION MECHANISM FOR LOW DRAG CALIPER BRAKE

(71) Applicant: MANDO CORPORATION, Gyeonggi-do (KR)

(72) Inventors: Antonio Eduardo Demorais, South Lyon, MI (US); Daniel Alan Smith, Livonia, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 37 days.

(21) Appl. No.: 15/490,856

(22) Filed: Apr. 18, 2017

(65) Prior Publication Data

US 2018/0298969 A1    Oct. 18, 2018

(51) Int. Cl.
| F16D 65/56 | (2006.01) |
| F16D 65/18 | (2006.01) |
| F16D 55/226 | (2006.01) |
| F16D 121/04 | (2012.01) |
| F16D 121/02 | (2012.01) |
| F16D 121/14 | (2012.01) |
| F16D 125/06 | (2012.01) |

(52) U.S. Cl.
CPC ......... *F16D 65/567* (2013.01); *F16D 55/226* (2013.01); *F16D 65/18* (2013.01); *F16D 65/183* (2013.01); *F16D 2121/02* (2013.01); *F16D 2121/04* (2013.01); *F16D 2121/14* (2013.01); *F16D 2125/06* (2013.01)

(58) Field of Classification Search
CPC ............. F16D 2125/06; F16D 2125/40; F16D 2127/02; F16D 2121/04; F16D 65/567
See application file for complete search history.

(56) References Cited

U.S. PATENT DOCUMENTS

| 2,888,104 | A | * | 5/1959 | Frayer | .................... | F16D 65/18 188/152 |
| 3,402,791 | A | * | 9/1968 | Hoenick | ................. | F16D 65/54 188/106 F |
| 3,653,470 | A | * | 4/1972 | Travis | ................... | F16D 65/567 188/106 F |
| 3,920,103 | A | * | 11/1975 | Haraikawa | .............. | F16D 65/18 188/196 D |
| 3,991,859 | A | * | 11/1976 | Coulter | ................... | F16D 65/18 188/106 F |
| 4,249,458 | A | * | 2/1981 | Massing | ................. | F16D 55/40 188/351 |
| 4,256,206 | A | * | 3/1981 | Maehara | ................. | F16D 65/18 188/196 D |

(Continued)

*Primary Examiner* — Thomas J Williams
*Assistant Examiner* — James K Hsiao
(74) *Attorney, Agent, or Firm* — Ladas & Parry, LLP

(57) ABSTRACT

A brake piston assembly is described. The brake piston assembly includes a brake piston, the brake piston comprising: a front face and a back surface, the front face opposite the back surface and the front face configured to exert pressure on a brake pad; a cavity extending into the brake piston from the rear surface; and a projection located within a cavity of the brake piston at a position intermediate the front face and the rear surface; a brake piston nut receivable into the cavity; and a flexible retainer, the flexible retainer located in a groove in an outer wall of the brake piston nut; wherein, when the piston nut is fully inserted into the cavity, the flexible retainer will be located between the projection and the front face.

18 Claims, 8 Drawing Sheets

(56) References Cited

U.S. PATENT DOCUMENTS

| | | | | |
|---|---|---|---|---|
| 4,306,635 A * | 12/1981 | Mitchell | ............... | F16D 65/18 188/370 |
| 4,313,526 A * | 2/1982 | Farr | ............... | F16D 55/22655 188/72.4 |
| 4,334,597 A * | 6/1982 | Tovagliaro | ............ | F16D 55/40 188/196 P |
| 4,378,863 A * | 4/1983 | Baum | ............... | F16D 65/567 188/196 D |
| 4,487,295 A * | 12/1984 | Mitchell | ............... | F16D 65/18 188/106 F |
| 4,681,194 A * | 7/1987 | Tsuruta | ............... | F16D 65/18 188/106 F |
| 4,779,711 A * | 10/1988 | Fabbro | ............... | F16D 65/567 188/196 D |
| 4,858,516 A * | 8/1989 | Klein | ............... | F16D 65/18 92/240 |
| 5,172,792 A * | 12/1992 | Cartwright | ............ | F16D 55/227 188/71.1 |
| 5,350,042 A * | 9/1994 | Thiel | ............... | F16D 65/567 188/196 D |
| 5,443,141 A * | 8/1995 | Thiel | ............... | F16D 65/567 188/196 D |
| 6,053,289 A * | 4/2000 | Bauer | ............... | F16D 65/567 188/71.9 |
| 6,227,340 B1 * | 5/2001 | Braford, Jr. | ......... | F16D 25/0638 192/48.1 |
| 6,382,367 B1 * | 5/2002 | Varzescu | ............... | F16D 65/18 188/72.7 |
| 6,637,317 B1 * | 10/2003 | Zeibig | ............... | B23P 15/10 92/129 |
| 6,659,236 B1 * | 12/2003 | Clark | ............... | F16D 65/18 188/196 V |
| 7,264,093 B2 * | 9/2007 | Hashida | ............... | B60T 8/32 188/106 P |
| 8,844,683 B2 * | 9/2014 | Sternal | ............... | B60T 7/107 188/72.6 |
| 8,851,241 B2 * | 10/2014 | Pericevic | ............... | F16D 65/18 188/196 A |
| 9,850,971 B1 * | 12/2017 | Demorais | ............... | F16D 65/18 |
| 2007/0062769 A1 * | 3/2007 | Noh | ............... | B60T 13/588 188/265 |
| 2007/0158148 A1 * | 7/2007 | Ohtani | ............... | F16D 65/18 188/158 |
| 2009/0057073 A1 * | 3/2009 | Ishii | ............... | B60T 5/00 188/71.6 |
| 2011/0048869 A1 * | 3/2011 | Schupska | ............... | B60T 13/745 188/71.1 |
| 2011/0132188 A1 * | 6/2011 | Winkler | ............... | F16J 1/006 92/108 |
| 2011/0155520 A1 * | 6/2011 | Takahashi | ............... | F16D 65/18 188/72.6 |
| 2011/0315007 A1 * | 12/2011 | Koch | ............... | F16D 65/18 92/172 |
| 2012/0261220 A1 * | 10/2012 | Sakashita | ............... | F16D 65/18 188/72.6 |
| 2013/0068572 A1 * | 3/2013 | Isono | ............... | F16D 55/226 188/72.3 |
| 2015/0001032 A1 * | 1/2015 | Veit | ............... | F16D 25/08 192/85.17 |
| 2015/0053512 A1 * | 2/2015 | Lee | ............... | F16D 65/38 188/72.3 |
| 2015/0308525 A1 * | 10/2015 | Kim | ............... | F16D 55/225 188/71.8 |
| 2017/0016501 A1 * | 1/2017 | Siegrist | ............... | F16D 55/226 |
| 2017/0023079 A1 * | 1/2017 | DeMorais | ............... | B60T 13/741 |
| 2017/0159733 A1 * | 6/2017 | Chelaidite | ............... | B60T 11/04 |

* cited by examiner

ACTIVE RETRACTION MECHANISM FOR LOW DRAG CALIPER BRAKE

TECHNICAL FIELD

This disclosure relates to brake systems including brake systems for automobiles, and describes an active retraction feature for retracting a brake piston after actuation.

BACKGROUND

The present disclosure relates to disk brake caliper pistons and piston systems, such as are used for various vehicles including automobiles, trucks, aircraft and the like. Embodiments of the disclosure include pistons having provision for a screw actuated braking capability including those having a threaded actuator system for a parking brake and a pressure actuated capability for additional braking capability such as braking capability actuated by a fluid pressure source such as a pneumatic or hydraulic pressure source. In various embodiments, the screw actuated braking capability can be actuated by a motor such as an electric motor or any other suitable type of motor or by actuation of a lever.

Brake pistons and disk brake pistons, such as disclosed herein, can be of any suitable construction, such as being made from steel, forged steel, plastic, ceramic and other metals which can be machined or otherwise manufactured to provide external sealing surfaces and an internal cavity. As shown in FIG. 1, an embodiment of a piston 1 has an internal cavity 2 with a threaded spindle 3 engaging an internally threaded nut 4 which upon relative rotation between the spindle 3 and the nut 4 the nut moves linearly toward or away from the brake pad end of the piston 5. Upon relative rotation in a first direction, the nut 4 moves toward the brake pad end of the piston 5 and then engages and pushes against the brake pad end of the piston, with the brake pad end of the piston 5 engaging the brake pad 6 directly or indirectly and causing a braking action between the brake pads 6, 7 and the rotor. In some embodiments, the movement of the nut 4 toward the brake pad end of the piston 5 can be done in conjunction with a pressure force being applied to the piston, and the force applied by the nut 4 to the brake pad end of the piston 5 can supplement the pressure force or can serve to partially or fully maintain the force applied to the piston by the pressure system when the pressure is reduced or eliminated. In some embodiments, the spindle 3 and nut 4 can be part of a parking brake, such as an electromechanically actuated parking brake actuated by a motor 8.

Upon relative rotation in a second direction, the nut 4 moves away from the brake pad end of the piston 5 and reduces and/or removes the force of the nut 4 acting upon the brake pad end of the piston 5.

Fluid pressure actuation of a brake system as shown in FIG. 1 causes piston 1 to move against brake pad 6, which in turn moves against a brake rotor (not shown.) The incomplete return of the brake pad, after moving against the brake rotor, causes drag and a braking effect results. Movement of the brake piston 1 during braking can be caused by the presence of pressure against one side of piston 1. However, return movement of piston 1 when the fluid pressure is released is also desirable, for example to allow a vehicle to roll freely without brake drag slowing the vehicle and leading to unnecessary fuel consumption and wear of parts. However the release of the fluid pressure will generally not provide a positive retraction of the brake piston 1 and cessation of the braking effect. In some embodiments, a square cut o-ring 22 can provide a small amount of positive retraction of the piston 1 when the fluid pressure is relieved. In some embodiments, this square o-ring 22 can also provide sealing of the braking fluid within the system of the brakes. In some embodiments, the retraction provided by the square o-ring can occur because upon application of fluid pressure, the movement of the piston causes a distortion of the square o-ring due to friction between the square o-ring 22 and the piston 1. Upon release of the fluid pressure, square o-ring 22 is allowed to move back to its undistorted position, and by way of friction between the square o-ring and the piston, drags the piston 1 back to its previous position. However, under some conditions, such as hard braking, or where brake parts are old or worn, the friction between the square o-ring 22 and the piston 1 can be reduced or the amount of movement is greater than the distortion of the square o-ring 22 can accommodate. As a result, the piston 1 can in some cases slip along the square o-ring 22 and at least a portion of the return effect can be lost. In addition, the design of the o-ring for brake return can in some instances compromise the design of the o-ring for sealing, and vice versa. Accordingly, alternate designs of brake piston retraction which provide a more positive return of the brake piston and which separate the functions of fluid sealing and piston return are desirable.

SUMMARY

In a first aspect, a brake piston assembly is provided, the brake piston assembly comprising: a brake piston, the brake piston comprising: a front face and a back surface, the front face opposite the back surface and the front face configured to exert pressure on a brake pad; a cavity extending into the brake piston from the rear surface; and a projection located within a cavity of the brake piston at a position intermediate the front face and the rear surface; a brake piston nut receivable into the cavity; and a flexible retainer, the flexible retainer located in a groove in an outer wall of the brake piston nut; wherein, when the piston nut is fully inserted into the cavity, the flexible retainer will be located between the projection and the front face.

In a second aspect, a brake piston assembly is provided, the brake piston assembly comprising: a brake piston; a brake piston nut; and a flexible retainer; wherein the brake piston nut is located in a cavity of the brake piston with the flexible retainer located in an opening in an outer wall of the brake piston nut and positioned adjacent to a projection on an inner surface of the cavity; wherein the brake piston assembly is configured such that upon fluid pressure actuation of the brake, the brake piston moves in relation to the brake piston nut in a first direction, compressing the flexible retainer against the projection, and upon release of the fluid pressure actuation of the brake, the flexible retainer expands and moves the brake piston in relation to the brake piston nut in a second direction opposite the first direction.

In an embodiment of the second aspect, the flexible retainer is an o-ring.

In an embodiment of the second aspect, the opening is a groove around the outer wall of the brake piston nut.

In an embodiment of the second aspect the opening is sized and configured for the flexible retainer to retract sufficiently into the opening to pass over the projection when the brake piston nut is removed from the brake piston.

In an embodiment of the second aspect the brake piston further comprises a front face configured to exert pressure upon a brake pad upon actuation of the brake piston assembly and a back surface of the brake piston opposite to the front surface, the cavity extending through the back surface at a cavity opening, and the projection comprising a forward surface directed toward the front face, the forward surface being curved and concave at a position which interacts with the flexible retainer.

In an embodiment of the second aspect, the flexible retainer is an o-ring and the o-ring is an elastomer.

In an embodiment of the second aspect, the opening is a groove around the outer wall of the brake piston nut and the brake piston further comprises a front face configured to exert pressure upon a brake pad upon actuation of the brake piston assembly and a back surface of the brake piston opposite to the front surface, and the groove comprises a forward surface and a rearward surface, the forward surface being proximal the front face and the rearward surface being proximal the back surface, and the forward surface is substantially parallel to the front face and the rearward surface is sloped from an internal end outward and rearward to an outer end.

In an embodiment of the second aspect, the opening is a groove around the outer wall of the brake piston nut and the brake piston further comprises a front face configured to exert pressure upon a brake pad upon actuation of the brake piston assembly and a back surface of the brake piston opposite to the front surface, and the groove comprises a forward surface and a rearward surface, the forward surface being proximal the front face and the rearward surface being proximal the back surface, and the forward surface is substantially parallel to the front face and the rearward surface is sloped from an inner end outward and rearward to an outer end and the rearward surface further comprises a radial surface extending outward from the outer end to the outer wall and the radial surface is substantially parallel to the front face.

In an embodiment of the second aspect the brake piston further comprises a front face configured to exert pressure upon a brake pad upon actuation of the brake piston assembly and a back surface of the brake piston opposite to the front surface, the cavity extending through the back surface at a cavity opening, and the projection comprising a forward surface directed toward the front face, the forward surface being curved and concave at a position which interacts with the flexible retainer and the projection further comprises a sloped rear surface, the rear surface extending inwardly and forwardly from the inner surface of the brake piston, and upon assembly of the brake piston nut with the brake piston, the flexible retainer is pushed into the opening as the flexible retainer contacts the rear surface and slides over the projection.

In an embodiment of the second aspect, the brake piston assembly is configured such that upon actuation of the brake assembly by the brake piston nut, a contacting portion of the front end of the brake piston nut pushes against a contacting portion of the inner surface of the brake piston causing the brake piston to push against a brake pad.

In an embodiment of the second aspect, the fluid is a liquid.

In an embodiment of the second aspect, the fluid is air.

In an embodiment of the second aspect, the brake piston assembly further comprises a Belleville washer connected to a spindle extending from an interior of the brake piston nut and through a backing plate at a back surface of the piston, wherein the Belleville washer removes slack from the spindle.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 2:
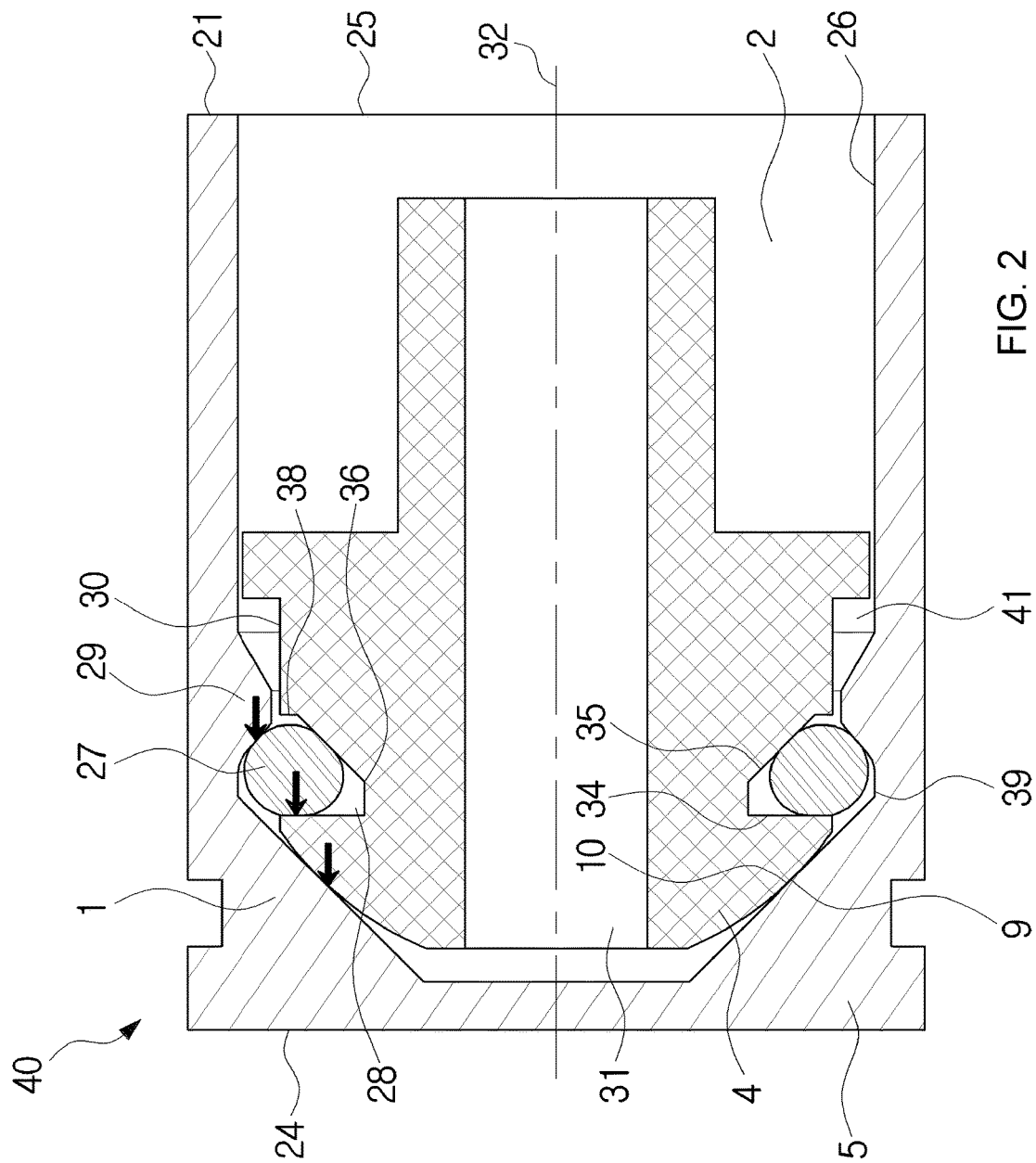
FIG. 2 shows an embodiment of a brake piston and nut with an internal flexible retainer.

As shown in FIG. 2, a brake piston assembly 40 can have a brake piston 1 can have a front face 24 on the brake pad end of piston 5 located and configured to contact directly or indirectly a brake pad 6 to apply force to the brake pad when the brake is actuated. Brake piston 1 can also have a back surface 21 having a piston opening 25 through which brake piston nut 4 can be inserted into the internal cavity 2 of brake piston 1. Between brake piston nut 4 and an internal surface 26 of brake piston 1 can be a flexible retainer 27. Flexible retainer 27 can be located in an opening 28 in an outer wall 30 of the brake piston nut 4. Inner surface 26 of brake piston 1 can have a projection 29 extending toward brake piston nut 4 intermediate the back surface 21 and the front face 24. In some embodiments, projection 29 can be positioned such that when the brake piston nut 4 is fully inserted into internal cavity 2 and a contact portion of the piston 9 contacts a contact portion of the nut 10 on the front end of the brake piston nut 4, the flexible retainer 27 can be between the front face 24 and the projection 29.

Figure 1:
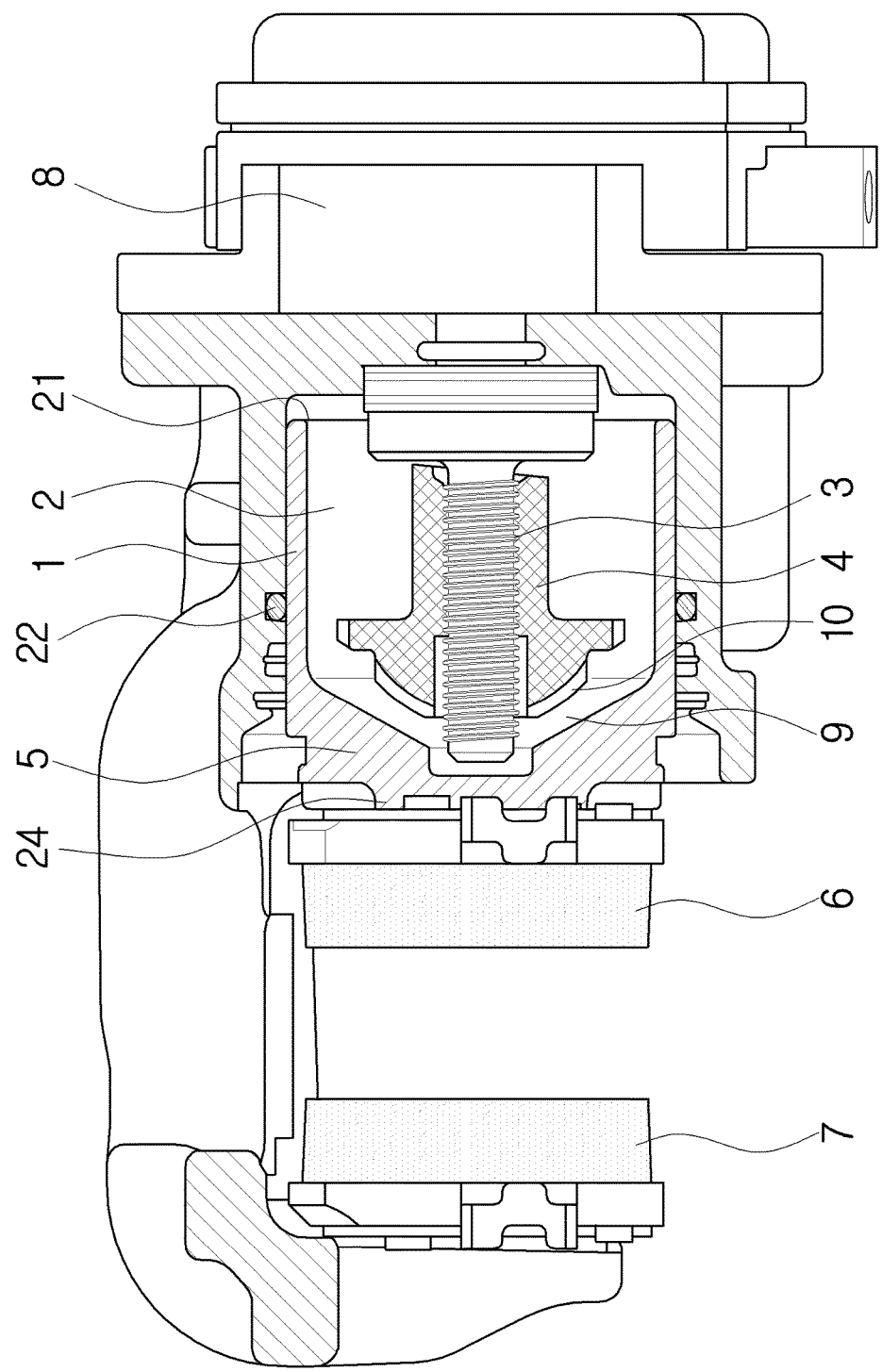
FIG. 1 shows a diagram of an embodiment of a brake system utilizing a piston and a square o-ring seal/return.
Figure 3:
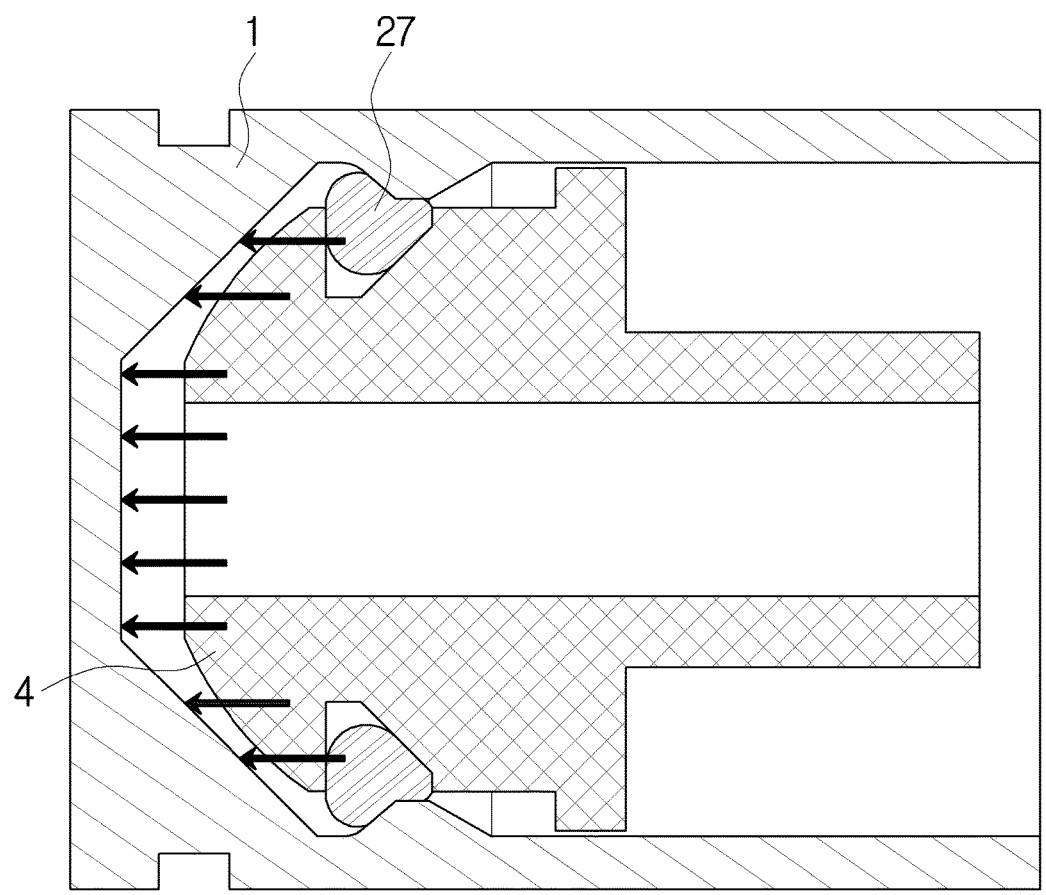
FIG. 3 shows an embodiment of a brake piston assembly with fluid pressure applied.

During operation of the brake piston assembly 40, when fluid pressure, such as hydraulic or pneumatic pressure, is applied to brake piston 1, brake piston 1 can move in relation to brake piston nut 4 toward brake pad 6, as shown in FIG. 3. This relative movement between the brake piston 1 and the brake piston nut 4 can result in the flexible retainer 27 being compressed between the projection 29 and the a surface of opening 28 of the brake piston nut 4, as shown in FIG. 3. In various embodiments, movement of brake piston nut 4 can be restrained by a spindle 3 present in the brake piston nut 4, as shown in FIG. 1.

Upon release of the fluid pressure, flexible retainer 27 can decompress and move brake piston 1 toward brake piston nut 4 and away from brake pad 6. The size and configuration of flexible retainer 27, opening 28 and projection 29 can be adjusted to achieve different amounts of return force and different amounts of clearance between contacting portion 10 of the brake piston nut and contacting portion 9 of the brake piston.

In some embodiments, one or more of the projection 29, the flexible retainer 27 and the opening 28 can be sized and configured to prevent slippage between flexible retainer 27 and piston 1 during operation. In some embodiments, one or more of the projection 29, the flexible retainer 27 and the opening 28 can be sized and configured for there to be no clearance between the flexible retainer 27 and the projection 29 when the contact portion of the piston 9 contacts the contact portion of the nut 10. In some embodiments, one or more of the projection 29, the flexible retainer 27 and the opening 28 can be sized and configured such that the flexible retainer 27 is compressed when the contact portion of the piston 9 contacts the contact portion of the nut 10 and can be further compressed by fluid pressure actuation of the brake piston assembly. In some embodiments, one or more of the projection 29, the flexible retainer 27 and the opening 28 can be sized and configured to have a gap between the flexible retainer 27 and the projection 29 when the contact portion of the piston 9 contacts the contact portion of the nut 10.

Various embodiments of the brake piston assembly 40 can be configured for different amounts of clearance between the contact portion of the piston 9 and the contact surface of the nut 10. In addition, various embodiments can achieve more consistent repositioning of this clearance after brake operation and brake operation under varying conditions and with varying amounts of brake force applied. This consistency in repositioning of the brake piston nut 4 in relation to the piston 1 can also result in greater consistency of the positioning of the piston 1 in relation to brake pad 6. This consistency can be advantageous in reducing brake drag and in controlling fluid displacement. In addition various designs allow separation of the fluid sealing function from the brake piston return function, which can result in simplified piston seal and seal groove designs.

Figure 4:
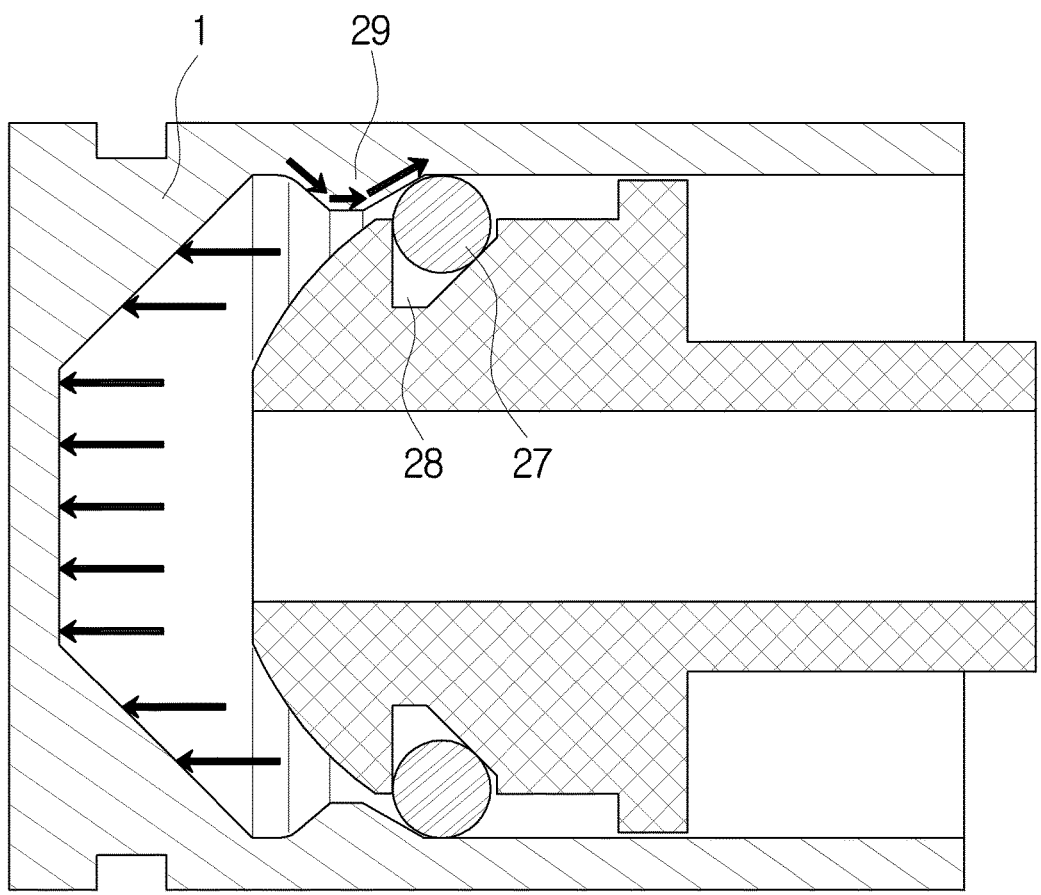
FIG. 4 shows an embodiment of a brake piston assembly with the brake piston nut being removed.

In some embodiments, it is possible to disassemble the brake piston nut 4 from the piston 1, by, for example pulling the brake piston nut 4 out from the piston 1, whereupon the flexible retainer 27 can compress into the opening 28 and the flexible retainer can move or slide over the projection 29, as shown in FIG. 4. In some embodiments, the brake piston nut 4 can be removed from piston 1 by applying fluid pressure to piston 1 when there is sufficient clearance or room for the piston move far enough for the flexible retainer 27 to compress into the opening 28 and for the flexible retainer to move or slide over projection 29, as shown in FIG. 4.

Figure 5:
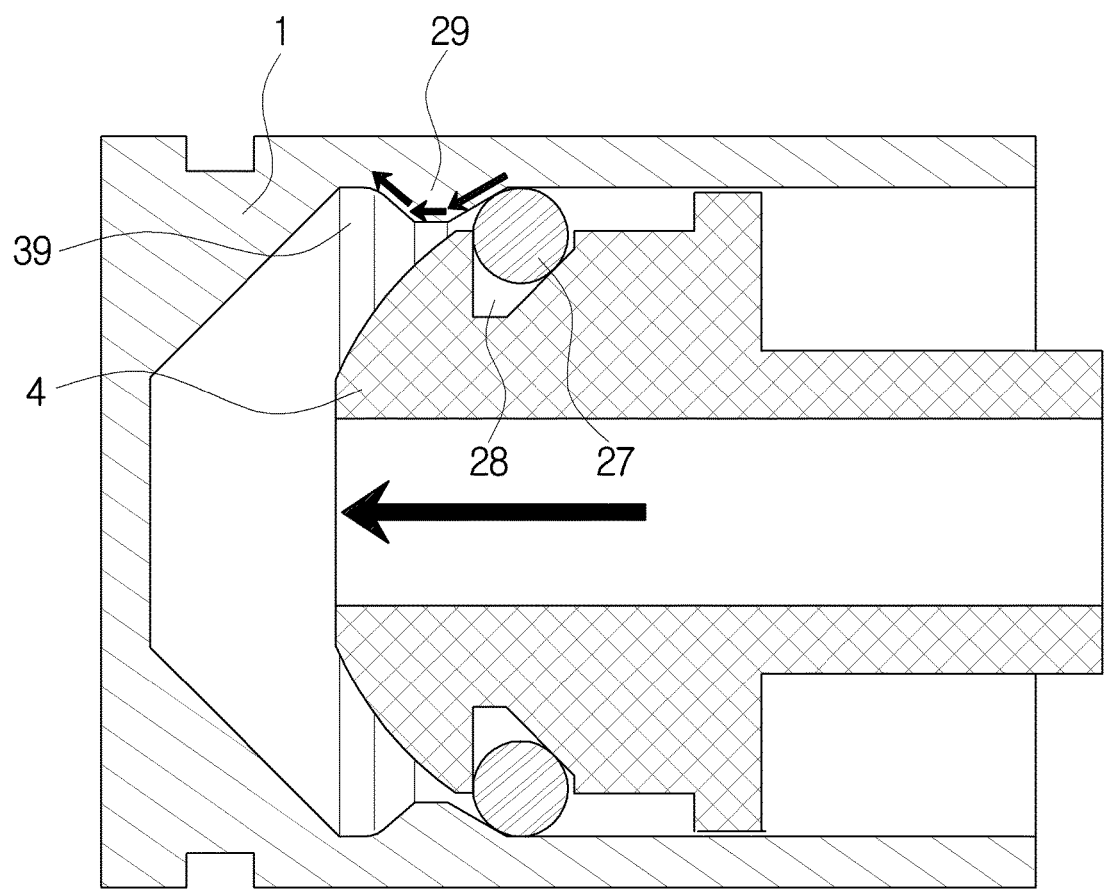
FIG. 5 shows an embodiment of a brake piston assembly with the brake piston nut being inserted.

In some embodiments, such as at initial assembly or at servicing, the brake piston nut 4 and the piston 1 can be assembled by pushing the brake piston nut 4 into the inner cavity 2 of the piston 1 sufficiently far for the flexible retainer 27 to compress into opening 28 sufficiently far to allow flexible retainer 27 to move or slide over projection 29 and into position in a recess 39 beyond projection 29, as shown in FIG. 5. In some embodiments, the movement of flexible retainer 27 over projection 29 can also be achieved by actuating a spindle 3 interfacing with brake nut 4, such as by actuating a parking brake or an MOC (motor on caliper) 8, also as shown in FIG. 5.

Opening

Figure 6:
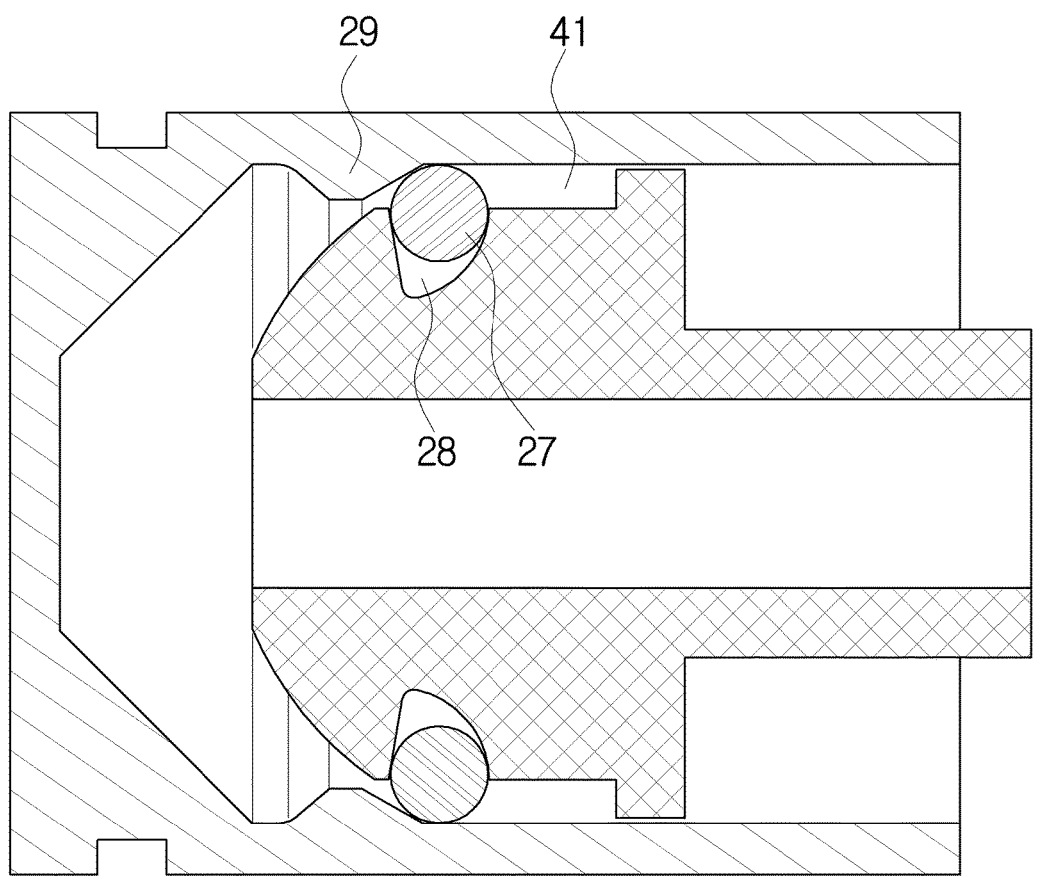
FIG. 6 shows an embodiment of a brake piston assembly and clearances around the flexible retainer.

In some embodiments, the opening 28 in the brake piston nut 4 can be located close to the front end 31 of the brake piston nut 4, and in some embodiments, the opening 28 can be located more distant from the front end 31 of the brake piston nut 4. In some embodiments, the forward surface 34 and rearward surface 35 can each be independently straight, sloped, curved or some combination thereof. In some embodiments, the forward face 34 and the rearward face 35 can be shaped and the opening 28 can be sized to facilitate the compression of the flexible retainer 27 into opening 28 rather than being moved or stretched into the nut-piston clearance area 41 when the brake piston nut 4 is pushed into position in piston 1, as shown in FIG. 6. In some embodiments, the rearward surface 35 can be curved and the forward surface 34 can have a forward slope to facilitate compression of the flexible retainer into opening 38. In some embodiments, the depth of the opening (distance from the outerwall 30 to the portion of the opening 28 closest to the central axis 32) can be varied to achieve the proper functioning of the flexible retainer 27 during operation and during assembly and disassembly. In some embodiments, the width of the bottom of the opening 28 (closest to the central axis 32) can be varied also to achieve proper functioning.

Flexible Retainer

In some embodiments, the flexible retainer 27 can be an elastomeric material or a plastic material. Suitable materials can be those elastomer and plastics suitable for the temperature and chemical environment of brake systems, such would be suitable for brake fluid, hydraulic fluid, compressed air or steam, depending upon the materials used for a particular brake system. In some embodiments, the flexible retainer 27 can be an o-ring, such as a round cut o-ring. In some embodiments, the flexible retainer 27 can be a solid elastomeric or plastic material. In some embodiments, the flexible retainer 27 can be a spongy or a hollow material. In some embodiments, the flexible retainer 27 can be configured to at least partially distort into the opening 28 in the brake piston nut 4 as the brake piston nut 4 is inserted into or removed from the internal cavity 2 of the piston 1 and the flexible retainer 27 slides over the projection 29. In some embodiments, the flexible retainer 27 can include voids, such as being of a spongy material or having holes, gaps, grooves and the like, so that the flexible retainer can itself be compressed as the flexible retainer 27 slides over projection 29 during insertion or removal of the brake piston nut 4. In some embodiments, the flexible retainer does not provide a seal between the brake piston nut 4 and the piston 1.

In some embodiments, the flexible retainer can be present in a relaxed state or in a stretched or in a compressed state when the brake piston nut 4 is in the operational position in piston 1 with the flexible retainer 27 in recess 39, and fluid pressure is not applied. In some embodiments, the flexible retainer can be stretch, compressed or relaxed when positioned on the brake piston nut 4 while the brake piston nut 4 is separated from the piston 1. In some embodiments, having the flexible retainer 27 in a stretched state, can be advantageous for keeping the flexible retainer 27 positioned in opening 28, such as where flexible retainer 27 is shaped like an o-ring.

Figure 7:
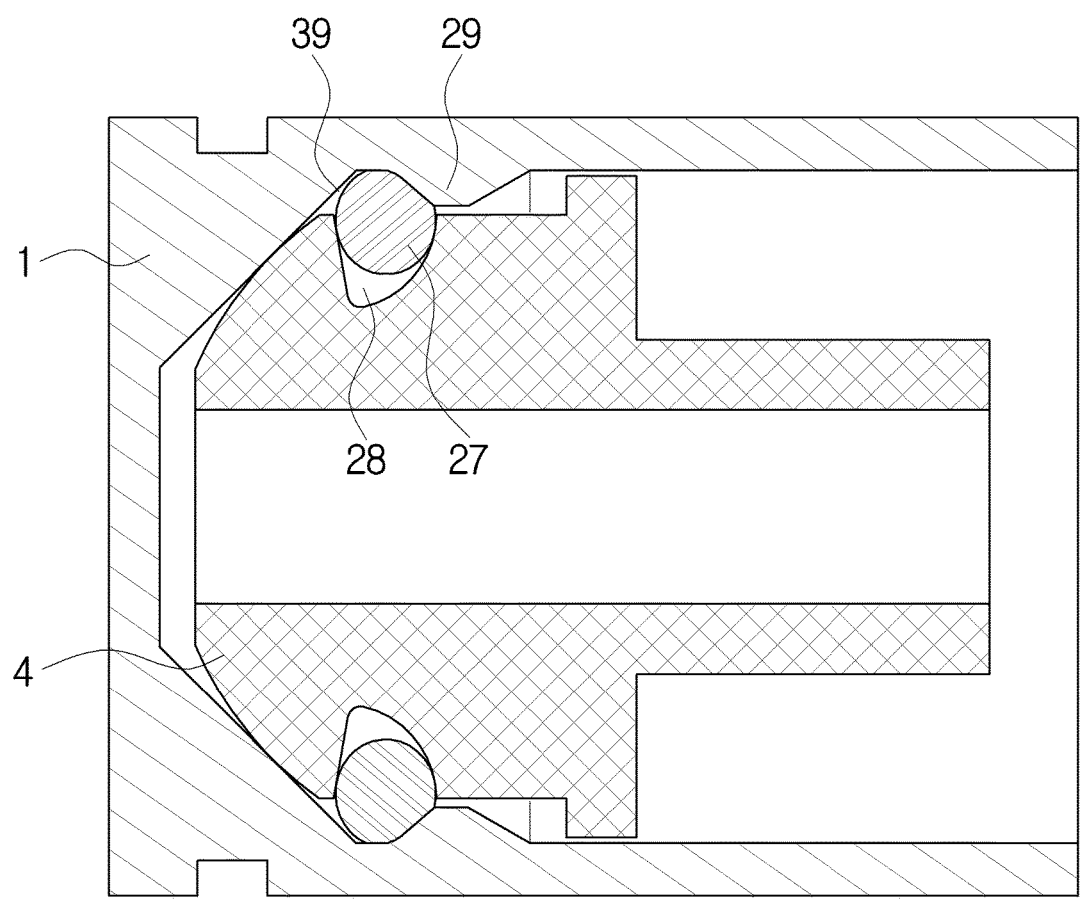
FIG. 7 shows an embodiment of a brake piston assembly where the removal of the brake piston nut is resisted by the flexible retainer.

In some embodiments, the shape of the rearward surface 35 and forward surface 34 combined with the elastic/plastic properties of the flexible retainer 27 can result in aiding the retention of the brake piston nut 4 in the operational position, as shown in FIG. 4, and providing an exponentially increasing resistance to disengaging (the brake piston nut 4 backing out of the piston 1), as shown in FIG. 7.

Projection

In some embodiments, the projection 29 can be a protrusion extending from the inner surface 26 toward the central axis 32 of the piston around the entire inner circumference of the brake piston 1. In some embodiments, the projection 29 can be a series of discrete protrusions extending from the inner surface 26 toward the central axis 32. In some embodiments, the projection 29 can have a projection front face 33 proximal the front face 24 of the piston 1 and a projection back face 34 distal the front face 24 of the piston 1. In some embodiments, the projection front face 33 can be concave as shown in FIG. 2. In some embodiments, the projection front face 33 can be sloped linearly. In some embodiments, the projection back face can be sloped linearly, as shown in FIG. 2. In some embodiments, the projection back face can be concave or convex.

In some embodiments, the projection can be a sleeve or a part of a sleeve inserted into the inner cavity 2 of the piston 1.

Opening in the Brake Piston Nut

In some embodiments, the opening 28 in the brake piston nut 4 can be sized to receive a portion of the flexible retainer 27. In some embodiments, the opening 28 can be sized for the entire flexible retainer 27 to compress into the opening 28 and not project above the opening 28. In some embodiments, the opening 28 can be sized and configured to have a forward surface 34 proximal the front end 31 of the brake piston nut 4 and a rearward surface 35 distal the front end 31 of the brake piston nut 4. In some embodiments, the front surface 34 can comprise a section that extends perpendicular or substantially perpendicular to the central axis 32. In some embodiments, the rearward surface can comprise a section that is sloped and a gap between the forward surface 34 and rearward surface 35 decreases the as the opening approaches the central axis. In some embodiments, the rearward surface 35 can be sloped from an inner end 36 outward and rearward to an outer end 37. In some embodiments, the rearward surface can comprise a a radial surface extending outward from the outer end to the outer wall and the radial wall is substantially perpendicular to the central axis 32.

Nut Retainer

Figure 8:
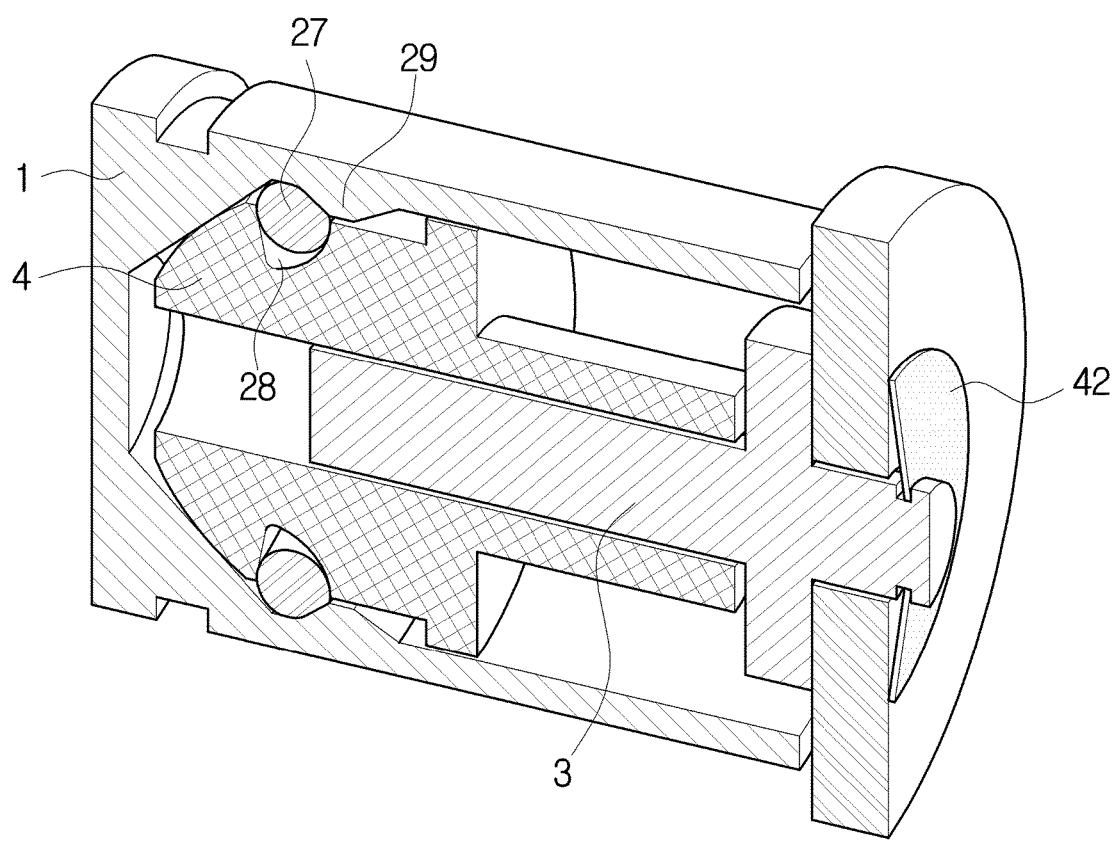
FIG. 8 shows an embodiment of a brake piston assembly with a retainer system at the back surface of the piston.

In some embodiments, a retainer or retaining system can be located at the back surface 21 of piston 1. In some embodiments, a Belleville washer 42 and/or a cir-clip can be affixed to the threaded spindle 3 to act as a retainer. FIG. 8 shows one such arrangement with a backing plate 43 located at or near the back surface 21 of the piston 1 with a Belleville washer 42 or a cir-clip attached to the spindle 3 passing through the backing plate 43. In some embodiments, the retainer or retaining system can preload the spindle 3 against the housing and preload the flexible retainer 27 against the projection 29. In some embodiments the preload can reduce or eliminate clearances between the piston 1 and nut 4 or flexible retainer 27. In some embodiments, the Belleville washer can be configured to pull the spindle 3 against the backing place 43. In some embodiments, the Belleville washer 42 can remove slack from the spindle 3, such as axial slack along the central axis 32 of the piston. In some embodiments, the retainer system can assist in aligning the spindle 3 and/or the brake piston nut 4 in relation to the central axis 32.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

Concepts

Concept 1.

A brake piston assembly comprising:
a brake piston, the brake piston comprising:
a front face and a back surface, the front face opposite the back surface and the front face configured to exert pressure on a brake pad;
a cavity extending into the brake piston from the rear surface; and
a projection located within a cavity of the brake piston at a position intermediate the front face and the rear surface;
a brake piston nut receivable into the cavity; and
a flexible retainer, the flexible retainer located in a groove in an outer wall of the brake piston nut;
wherein, when the piston nut is fully inserted into the cavity, the flexible retainer will be located between the projection and the front face.

Concept 2.

A brake piston assembly comprising:
a brake piston;
a brake piston nut; and
a flexible retainer;
wherein the brake piston nut is located in a cavity of the brake piston with the flexible retainer located in an opening in an outer wall of the brake piston nut and positioned adjacent to a projection on an inner surface of the cavity;
wherein the brake piston assembly is configured such that upon fluid pressure actuation of the brake, the brake piston moves in relation to the brake piston nut in a first direction, compressing the flexible retainer against the projection, and upon release of the fluid pressure actuation of the brake, the flexible retainer expands and moves the brake piston in relation to the brake piston nut in a second direction opposite the first direction.

Concept 3

The brake piston assembly of concept 2, wherein the flexible retainer is an o-ring.

Concept 4

The brake piston assembly of concept 2, wherein the opening is a groove around the outer wall of the brake piston nut.

Concept 5

The brake piston assembly of concept 2, wherein the opening is sized and configured for the flexible retainer to retract sufficiently into the opening to pass over the projection when the brake piston nut is removed from the brake piston.

Concept 6

The brake piston assembly of concept 2, wherein the brake piston further comprises a front face configured to exert pressure upon a brake pad upon actuation of the brake piston assembly and a back surface of the brake piston opposite to the front surface, the cavity extending through the back surface at a cavity opening, and the projection comprising a forward surface directed toward the front face, the forward surface being curved and concave at a position which interacts with the flexible retainer.

Concept 7

The brake piston assembly of concept 3, wherein the o-ring is an elastomer.

Concept 8

The brake piston assembly of concept 4, wherein the brake piston further comprises a front face configured to exert pressure upon a brake pad upon actuation of the brake piston assembly and a back surface of the brake piston opposite to the front surface, and the groove comprises a forward surface and a rearward surface, the forward surface being proximal the front face and the rearward surface being proximal the back surface, and the forward surface is substantially parallel to the front face and the rearward surface is sloped from an inner end outward and rearward to an outer end.

Concept 9

The brake assembly of concept 8, wherein the rearward surface further comprises a radial surface extending outward from the outer end to the outer wall and the radial wall is substantially parallel to the front face.

Concept 10

The brake assembly of concept 6, wherein the projection further comprises a sloped rear surface, the rear surface extending inwardly and forwardly from the inner surface of the brake piston, and upon assembly of the brake piston nut with the brake piston, the flexible retainer is pushed into the opening as the flexible retainer contacts the rear surface and slides over the projection.

Concept 11

The brake assembly of concept 2, wherein the brake piston assembly is configured such that upon actuation of the brake assembly by the brake piston nut, a contacting portion of the front end of the brake piston nut pushes against a contacting portion of the inner surface of the brake piston causing the brake piston to push against a brake pad.

Concept 12

The brake assembly of concept 2, wherein the fluid is a liquid.

Concept 13

The brake assembly of concept 2, wherein the fluid is air.

Concept 14

The brake assembly of concept 2, further comprising a Belleville washer connected to a spindle extending from an interior of the brake piston nut and through a backing plate at a back surface of the piston, wherein the Belleville washer removes slack from the spindle.

We claim:

1. A brake piston assembly comprising:
   a brake piston, the brake piston comprising:
   a front face and a back surface, the front face opposite the back surface and the front face configured to exert pressure on a brake pad;
   a cavity extending into the brake piston from the back surface; and
   a projection located within a cavity of the brake piston at a position intermediate the front face and the back surface;
   a brake piston nut receivable into the cavity; and
   a flexible retainer, the flexible retainer located in a groove in an outer wall of the brake piston nut;
   wherein, when the piston nut is fully inserted into the cavity, the flexible retainer will be located between the projection and the front face, and
   wherein the projection comprises a sloped forward surface directed toward the front face and a sloped rear surface.

2. The brake assembly of claim 1, wherein the projection protrudes inwardly from an inner surface of the cavity.

3. A brake piston assembly comprising:
   a brake piston;
   a brake piston nut; and
   a flexible retainer;
   wherein the brake piston nut is located in a cavity of the brake piston with the flexible retainer located in an opening in an outer wall of the brake piston nut and positioned adjacent to a projection on an inner surface of the cavity;
   wherein the brake piston assembly is configured such that upon fluid pressure actuation of the brake, the brake piston moves in relation to the brake piston nut in a first direction, compressing the flexible retainer against the projection, and upon release of the fluid pressure actuation of the brake, the flexible retainer expands and moves the brake piston in relation to the brake piston nut in a second direction opposite the first direction.

4. The brake piston assembly of claim 3, wherein the flexible retainer is an o-ring.

5. The brake piston assembly of claim 4, wherein the o-ring is an elastomer.

6. The brake piston assembly of claim 3, wherein the opening is a groove around the outer wall of the brake piston nut.

7. The brake piston assembly of claim 6, wherein the brake piston further comprises a front face configured to exert pressure upon a brake pad upon actuation of the brake piston assembly and a back surface of the brake piston opposite to the front surface, and the groove comprises a forward surface and a rearward surface, the forward surface being proximal the front face and the rearward surface being proximal the back surface, and the forward surface is substantially parallel to the front face and the rearward surface is sloped from an inner end outward and rearward to an outer end.

8. The brake piston assembly of claim 3, wherein the opening is sized and configured for the flexible retainer to retract sufficiently into the opening to pass over the projection when the brake piston nut is removed from the brake piston.

9. The brake assembly of claim 7, wherein the rearward surface further comprises a radial surface extending outward from the outer end to the outer wall and the radial wall is substantially parallel to the front face.

10. The brake piston assembly of claim 3, wherein the brake piston further comprises a front face configured to exert pressure upon a brake pad upon actuation of the brake piston assembly and a back surface of the brake piston opposite to the front surface, the cavity extending through the back surface at a cavity opening, and the projection comprising a forward surface directed toward the front face, the forward surface being curved and concave at a position which interacts with the flexible retainer.

11. The brake assembly of claim 10, wherein the projection further comprises a sloped rear surface, the rear surface extending inwardly and forwardly from the inner surface of the brake piston, and upon assembly of the brake piston nut with the brake piston, the flexible retainer is pushed into the opening as the flexible retainer contacts the rear surface and slides over the projection.

12. The brake assembly of claim 3, wherein the brake piston assembly is configured such that upon actuation of the brake assembly by the brake piston nut, a contacting portion of the front end of the brake piston nut pushes against a contacting portion of the inner surface of the brake piston causing the brake piston to push against a brake pad.

13. The brake assembly of claim 3, wherein the fluid is a liquid.

14. The brake assembly of claim 3, wherein the fluid is air.

15. The brake assembly of claim 3, further comprising a Belleville washer connected to a spindle extending from an interior of the brake piston nut and through a backing plate at a back surface of the piston, wherein the Belleville washer removes slack from the spindle.

16. The brake assembly of claim 3, wherein the projection comprises a sloped forward surface and a sloped rear surface.

17. The brake assembly of claim 16, wherein the sloped forward surface is directed toward a front face of the brake piston configured to exert pressure on a brake pad.

18. The brake assembly of claim 3, wherein the projection protrudes inwardly from an inner surface of the cavity.

\* \* \* \* \*